UNITED STATES PATENT OFFICE.

LINNIE E. OSTRANDER, OF HARBOR, OREGON.

PRESERVATION OF NATURAL FLOWERS.

996,788.

Specification of Letters Patent. Patented July 4, 1911.

No Drawing. Application filed February 18, 1911. Serial No. 609,423.

*To all whom it may concern:*

Be it known that I, LINNIE E. OSTRANDER, a citizen of the United States, residing at Harbor, in the county of Curry and State of Oregon, have invented certain new and useful Improvements in Preservation of Natural Flowers; and I do hereby declare the following to be a full, clear, and exact description of the invention, such as will enable others skilled in the art to which it appertains to make and use the same.

My invention relates to a method for the preservation of natural flowers and my object is to cover the natural flower with a preservative which will retain the shape of the parts of the flower and prevent the destruction thereof by decay. The treated flower is then restored to its natural colors by painting or coloring the parts thereof. To this end, I employ a quantity of glue, preferably what is known as flake glue, which is deposited in a receptacle and covered with water. The glue remains in this condition for substantially twelve hours or over night. After the glue has remained in the water the proper length of time, the greater part of the water is drained off, leaving only a sufficient amount to thin the glue to the consistency of cold mucilage. After the water has been drained from the glue, the receptacle containing the glue is placed in warm water, the usual form of double boiler being preferably used. To each quart of the preparation thus obtained, add four tablespoonfuls of granulated sugar and stir until all of the sugar is absorbed by the preparation. When the preparation is in this state you first add two tablespoonfuls of epsom salts and mix the same thoroughly, and then add a tablespoonful of tartaric acid which makes the glue transparent and helps to maintain the natural color of the flower. The preparation is then ready for use and is to be kept at a tepid temperature while being used, which can be accomplished by placing the receptacle containing the preparation in warm water or by placing the same upon a stove, but great care must be exercised to prevent the preparation from becoming too hot, as the delicate parts of the flower would be shriveled or destroyed if the temperature of the preparation was at too high a degree. By adding the sugar to the glue, the flowers are given a fresh appearance and the glue or preparation is prevented from peeling when dry.

The flowers being treated, should be as fresh as possible, but if wilted, should be restored to their natural state, as near as possible, by immersing the same in water. The flowers are then treated one at a time by grasping the stem of the flower and immersing the flower into the preparation. The flower is moved gently back and forth through the preparation until all parts thereof are thoroughly covered, when the flower is removed and the petals straightened out and restored to their natural shape by passing each part hereof between the thumb and finger, the pressure of the thumb and finger being necessarily very light so as to avoid removing the petals from the stem. Before engaging the thumb and finger with the treated portion of the flower, however, the hand is preferably immersed in warm water, so as to prevent the preparation from adhering to the fingers, or a suitable instrument can be used if desired. The flower is then slightly agitated, which will cause the excess of the preparation to leave the parts of the flower. The flower is then placed in a cold draft and is held upright until the preparation has become cool. When the preparation has properly cooled, the flower is dipped into a coloring solution of alcohol and a suitable dye and held therein until the proper tint is obtained, when the flower is taken out and shaken or otherwise agitated to remove the extra coloring substance adhering to the flower. The flower is then allowed to gradually dry by suspending the same from any suitable object and after the petals have been fully treated, the stem and leaf portions of the flower are treated the same as the petals and then immersed in a coloring having a green tint.

If there is more than one color in the flower, it will be necessary to use a soft brush in applying the coloring substance, the darker colors being applied first.

Any suitable coloring medium may be used, such as diamond dyes or inks, or if preferred, the usual form of enamel paints may be used.

After the flowers have been treated with glue and properly colored and are thoroughly dry, they are given a coating of varnish by immersing the flower therein.

If the flowers are to be laid down after the preparation has been added thereto, they are preferably placed upon a wet cloth to prevent the flowers from sticking to the object upon which they are resting.

After the flowers have been treated in the manner above set forth, they are suspended from a line or other similar object until thoroughly dry, when the flowers will be preserved substantially in their natural state and when properly handled will remain so for all time. It will further be seen that by coloring the flowers after they have been treated, any tint or hue may be obtained, such as a black rose or any preferred color.

What I claim is:

1. The herein described method for the preservation of natural flowers, comprising an immersion of said flowers into a preparation of glue, sugar, epsom salts and tartaric acid.

2. The herein described process for preservation of natural flowers, comprising an immersion of the flower into the preparation of liquid glue, sugar, epsom salts and tartaric acid, then immersing said flower in colored alcohol, and then coating said flower with colorless varnish.

3. The herein described method for the preservation of natural flowers, comprising the immersion of the flowers into a preparation of heated glue, sugar, epsom salts and tartaric acid, then adding coloring material to said flower, and then coating said flower with varnish.

In testimony whereof I have signed my name to this specification in the presence of two subscribing witnesses.

LINNIE E. OSTRANDER.

Witnesses:
JOHN W. OSTRANDER,
GEO. W. SMITH.